United States Patent [19]

Seiler

[11] Patent Number: 4,808,706
[45] Date of Patent: Feb. 28, 1989

[54] FIBRE-REACTIVE, FLUORO-TRIAZINE CONTAINING DYESTUFFS

[75] Inventor: Herbert Seiler, Riehen, Switzerland

[73] Assignee: Ciba-Geigy Corporation, Ardsley, N.Y.

[21] Appl. No.: 580,032

[22] Filed: Feb. 14, 1984

Related U.S. Application Data

[63] Continuation of Ser. No. 408,565, Aug. 16, 1982, abandoned, which is a continuation of Ser. No. 171,634, Jul. 24, 1980, abandoned, which is a continuation of Ser. No. 938,286, Aug. 30, 1978, abandoned.

[30] Foreign Application Priority Data

Sep. 6, 1977 [LU] Luxembourg ............................ 78082

[51] Int. Cl.$^4$ .................... C09B 62/085; C09B 62/08; C09B 62/09; C09B 62/095
[52] U.S. Cl. ........................................ 534/638; 8/549; 260/373; 260/374; 534/622; 534/623; 534/624; 534/625; 534/618; 534/628; 534/631; 534/632; 534/635; 534/636; 534/637
[58] Field of Search .................. 260/153; 534/638, 632

[56] References Cited

U.S. PATENT DOCUMENTS

| | | | |
|---|---|---|---|
| 3,627,749 | 12/1971 | Ackermann et al. | 260/153 |
| 4,115,378 | 9/1978 | Bien et al. | 260/153 X |

FOREIGN PATENT DOCUMENTS

| | | | |
|---|---|---|---|
| 1188606 | 4/1970 | Fed. Rep. of Germany | 260/153 |
| 1644208 | 9/1970 | Fed. Rep. of Germany | 260/153 |
| 2556640 | 7/1976 | Fed. Rep. of Germany | 260/153 |
| 2557141 | 7/1976 | Fed. Rep. of Germany | 260/146 T |
| 2611550 | 9/1976 | Fed. Rep. of Germany | 260/153 |
| 2728354 | 12/1977 | Fed. Rep. of Germany | 260/153 |
| 2655089 | 6/1978 | Fed. Rep. of Germany | 260/153 |

*Primary Examiner*—Charles F. Warren
*Assistant Examiner*—Carolyn S. Greason
*Attorney, Agent, or Firm*—Kevin T. Mansfield; Edward McC. Roberts

[57] ABSTRACT

Dyes of the formula

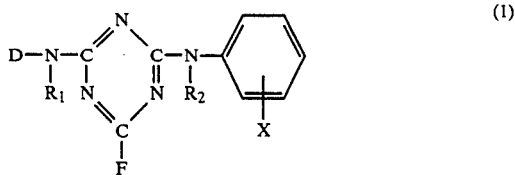

(1)

wherein D is the radical of an organic dye, $R_1$ is hydrogen or methyl, $R_2$ is alkyl of 2 to 4 carbon atoms, and X is hydrogen or methyl.

2 Claims, No Drawings

FIBRE-REACTIVE, FLUORO-TRIAZINE CONTAINING DYESTUFFS

This is a continuation of application Ser. No. 408,565, filed 8/16/82, (abandoned), which is a continuation of Ser. No. 171,634, filed 7/24/80 (abandoned) which is a continuation of Ser. No. 938,286, filed 8/30/78 (abandoned).

The present invention provides dyes of the formula

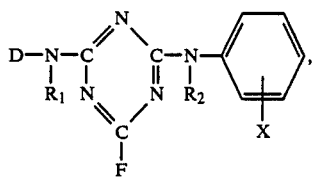
(1)

wherein D is the radical of an organic dye, $R_1$ is hydrogen or methyl, $R_2$ is alkyl of 2 to 4 carbon atoms, and X is hydrogen or methyl.

In the dyes of the formula (1), the radical D is in particular the radical of a dye of the monoazo, polyazo, metal complex, anthraquinone, phthalocyanine, formazane, azomethine, nitroaryl, dioxazine, phenazine or stilbene series.

The radical D preferably contains water-solubilising groups, in particular sulphonic acid groups.

Preferred dyes are those of the formula I wherein D is the radical of an azo dye.

Particularly preferred dyes are those of the formula

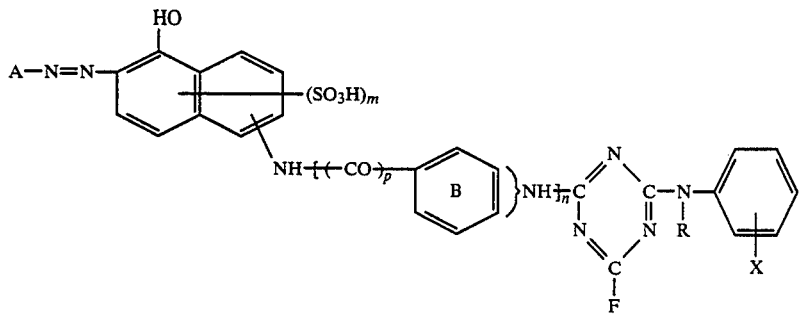
(2)

wherein A is a benzene or naphthalene radical, m is 1 or 2, n is 0 or 1, p is 0 or 1, R is alkyl of 2 to 4 carbon atoms, and X is hydrogen or methyl, and the benzene or naphthalene radical A and the benzene radical B can contain further substituents.

The substituents $R_2$ in formula (1) as alkyl of 2 to 4 carbon atoms is ethyl, propyl, isopropyl, butyl, isobutyl, sec-butyl and tert-butyl.

The radical of an organic dye D in formula (1), and the benzene of naphthalene radical A and the benzene radical B in formula (2) can contain further substituents, for example: alkyl groups of 1 to 4 carbon atoms, such as methyl, ethyl and propyl; acylamino groups of 1 to 6 carbon atoms, such as acetylamino, propionylamino and benzoylamino; amino groups, such as $-NH_2$, methylamino and ethylamino; the ureido, hydroxyl and carboxyl group; and halogen, such as fluorine, chlorine and bromine.

The radicals D, A and B contain in particular sulfonic acid groups as substituents.

If the radical D or A contains complex-forming groups, such as hydroxyl, carboxyl, amino and sulfo groups, it is also possible to obtain the heavy metal complexes of the dyes of the formulae (1) and (2).

Valuable dyes of the formula (1) are for example the dye of the formula

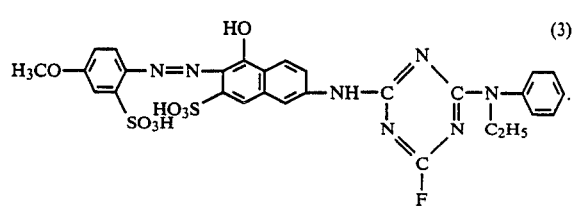
(3)

and the dye of the formula

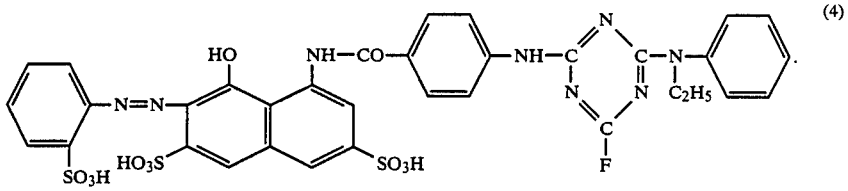
(4)

The dyes of the formula (1) are fibre-reactive as they contain a removable fluorine atom in the s-triazine radical.

By fibre-reactive compounds are meant those compounds which are able to react with the hydroxyl groups of cellulose or with the amino groups of natural or synthetic polyamides to form covalent chemical bonds.

The dyes of the formula (1) are obtained by condensing, in any order, 2,4,6-trifluoro-s-triazine of the formula

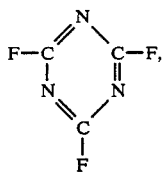

an organic dye of the formula

 (6)

or a primary product of an organic dye of the formula (6), and an aminobenzene of the formula

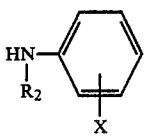 (7)

to give a dye of the formula (1), and, if primary products are used, converting these latter into the desired end dyes of the formula (1).

A preferred embodiment of the process for the production of the dyes of the formula (1) consists in using as starting materials organic dyes of the formula (6), wherein D is the radical of an azo dye, or in condensing diazo components and/or coupling components which contain a —N(R$_1$)H group with the 2,4,6-trifluoro-s-triazine of the formula (6), and subsequently, or after the further condensation with the aminobenzene of the formula (7), finally obtaining the end dye by coupling with the respective other component of the azo dye.

The preferred dyes of the formula (2) are obtained by reacting, in any order, a diazotised amino compound of the formula

A—NH$_2$ (8)

a coupling component of the formula

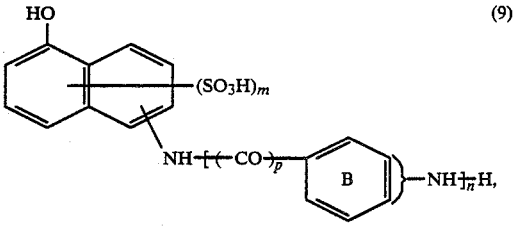 (9)

2,4,6-trifluoro-1,3,5-triazine of the formula

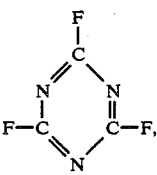 (5)

and an aminobenzene of the formula

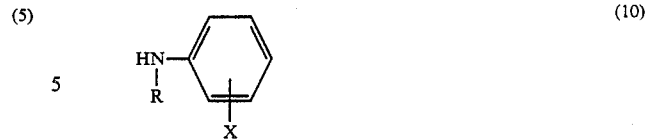 (10)

by coupling and condensation, to give a dye of the formula (2).

If the dyes of the formula (1) or (2) contain complex-forming groups, they can subsequently be reacted with heavy metal donors.

As the individual process steps described above can be carried out in varying sequence, and if desired also in some cases simultaneously, different variant of the process are possible.

In general, the reaction is carried out stepwise in succession and the sequence of the simple reactions between the individual reaction components of the formulae (5), (6) and (7) can be freely chosen.

Important process variants for producing the preferred dyes of the formula (2) comprise:

(1) coupling a diazotised amino compound of the formula (8) with a coupling component of the formula (9) to give an azo compound of the formula

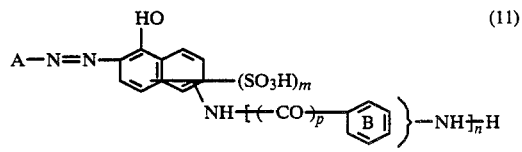 (11)

condensing this azo compound with 2,4,6-trifluoro-1,3,5-triazine of the formula (5) and condensing the primary condensation product with an aminobenzene of the formula (10) to give an azo dye of the formula (2);

(2) condensing a coupling compound of the formula (9) with 2,4,6-trifluoro-1,3,5-triazine of the formula (5), condensing the primary condensation product with an aminobenzene of the formula (10) and coupling the secondary condensation product with a diazotised amino compound of the formula (8) to give an azo dye of the formula (2);

(3) condensing a coupling component of the formula (9) with 2,4,6-trifluoro-1,3,5-triazine of the formula (5), coupling a diazotised amino compound of the formula (8) to the primary condensation product, and condensing the resulting azo compound with an aminobenzene of the formula (10) to give an azo dye of the formula (2).

The particularly valuable dyes of the formulae (3) and (4) are preferably obtained by process variant (1) by condensing 2-amino-6-(4'-methoxy-2'-sulfophenylazo)-5-hydroxynaphthalene-7-sulfonic acid with 2,4,6-trifluoro-s-triazine and replacing a fluorine atom at the s-triazine ring by a N-ethylphenylamino group by condensation with N-ethylaminobenzene, or by condensing 1-(4'-aminobenzoylamino)-7-(2''-sulfophenylazo)-8-hydroxynaphthalene-3,6-disulfonic acid with 2,4,6-trifluoro-s-triazine and replacing a fluorine atom at the s-triazine ring by a N-ethylphenylamino group by condensation with N-ethylaminobenzene.

As dyes of the formula (6) there are used in particular those wherein the radical D is the radical of a dye of the monoazo, polyazo, metal complex, anthraquinone, phthalocyanine, formazane, azomethine, nitroaryl, dioxazine, phenazine or stilbene series.

Preferably, organic dyes of the formula (6), wherein the radical D contains water-solubilising groups, or primary products of organic dyes of the formula (6) which contain water-solubilising groups, are used as starting materials. Suitable water-solubilising groups are in particular sulphonic acid groups.

The preferred starting materials are organic dyes of the formula (6), wherein D is the radical of a monoazo or disazo dye.

Such a preferred embodiment comprises condensing, in any order, an organic dye of the formula

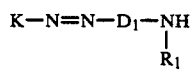  (12)

wherein $D_1$ is the radical of a diazo component of the benzene or naphthalene series, K is the radical of a coupling component of the benzene, naphthalene or heterocyclic series, and $R_1$ is hydrogen or methyl, 2,4,6-trifluoro-s-triazine of the formula (5) and an aminobenzene of the formula (7), to give a dye of the formula (1).

In a modification of the above process, the dyes of the formula (1), wherein D is the radical of an organic dye composed of two or more components, can be obtained by condensing a component of the dye of the formula (6) which contains a

group, a 2,4,6-trifluoro-s-triazine of the formula (5) and an aminobenzene of the formula (7), and, in any step of the process, reacting the condensation product with the other component or components of the dye of the formula (6) to give a dye of the formula (1).

Examples of such organic dyes which are composed of two or more components are: monoazo, disazo, trisazo, tetrazo, metal complex, formazane and azomethine dyes.

The above described process modification is chiefly of importance for the production of dyes of the formula (1), wherein the radical D is the radical of an azo dye which contains sulfo groups. In these dyes, that portion of the azo dyestuff radical to which the s-triazine is attached can be either the radical of the diazo component or the radical of the coupling component. This possibility gives rise to two variants of the above described modification of the process.

The first of these two variants consists in condensing a diazo component which contains a

group with 2,4,6-trifluoro-s-triazine of the formula (5), diazotising the resulting condensation product and coupling the diazonium compound to a coupling component, and reacting the resulting azo compound, before or after the coupling, with an aminobenzene of the formula (7).

The second variant consists in condensing a coupling component which contains a

group with 2,4,6-trifluoro-s-triazine of the formula (5) and coupling a diazotised diazo component to the condensation product and reacting the resulting azo compound, before or after the coupling, with an aminobenzene of the formula (7).

In this process variant, it is possible to obtain dyes of the formula (1) which contain two reactive radicals by condensing a diazo component which contains a

group with a 2,4,6-trifluoro-s-triazine of the formula (5), and also condensing a coupling component which contains a

group with a 2,4,6-trifluoro-s-triazine of the formula (5) and diazotising the condensation product of the diazo component and coupling the diazonium compound to the condensation product of the coupling component and reacting the resulting azo compound, before or after the coupling, with an aminobenzene.

Dyes, which contain two or more reactive radicals can also be obtained by condensing dyes of the formula (6) which contain further

groups in the radical D with a corresponding amount of the 2,4,6-trifluoro-s-triazine of the formula (5), so that two or more s-triazine radicals are introduced into the dye molecule.

The condensation of the 2,4,6-trifluoro-s-triazine of the formula (5) with the organic dyes of the formula (6), the diazotisable and/or couplable components which contain a

group, and with the aminobenzenes of the formula (7), is carried out preferably in aqueous solution or suspension, at low temperature and at a weakly acid, or neutral to weakly alkaline pH value, and such that at least one removable fluorine atom remains in the end dye of the formula (1). The hydrogen fluoride which is set free during the condensation is advantageously neutralised continuously by the addition of an aqueous alkali hydroxide, carbonate or bicarbonate.

As starting materials for the production of the dyes of the formula (1) there may be mentioned:
(a) 2,4,6-trifluoro-s-triazine (cyanuric fluoride) of the formula (5)
(b) Organic dyes of the formula (6)

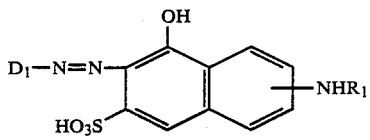 (13)

wherein $D_1$ is an at most bicyclic aryl radical which contains no azo groups and —$NHR_1$ groups, R is hydrogen or methyl and the —NHR group is preferably bonded to the 5-, 6-, 7- or 8-position of the naphthalene nucleus, and which additionally can contain a sulfonic acid group in the 5- or 6-position of the naphthalene nucleus.

$D_1$ can be a radical of the naphthalene or benzene series which does not contain any azo substituents, or can be a stilbene, diphenyl, benzthiazolylphenyl or diphenylamino radical. In this class, attention is also drawn to the related dyes in which the —$NHR_1$ group, instead of being bonded to the naphthalene nucleus, is bonded to a benzoylamino or anilino group which is bonded to the 5-, 6-, 7- or 8-position of the naphthalene nucleus.

Particularly valuable starting dyes are those wherein $D_1$ is a sulfonated phenyl or naphthyl radical, especially those which contain a —$SO_3H$ group in the ortho-position to the azo bond. The phenyl radical can be further substituted, for example by halogen atoms, such as chlorine atoms, alkyl radicals, such as methyl, acylamino groups, such as acetylamino and alkoxy radicals, such as methoxy.

2. Disazo compounds of the formula (13), wherein $D_1$ is a radical of the azobenzene, azonaphthalene or phenylazonaphthalene series and the naphthalene nucleus is substituted by the —$NHR_1$ group and, if desired, by sulfonic acid, as in class 1.

3 Monoazo compounds of the formula

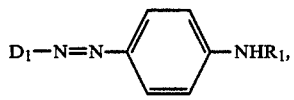 (14)

wherein $D_1$ is an at most bicyclic aryl radical, as described in class 1, and is preferably a disulonaphthyl radical or a stilbene radical, R is hydrogen or methyl, and the benzene nucleus can contain further substituents, such as halogen atoms or alkyl, alkoxy, carboxylic acid, ureido and acylamido groups.

4. Monoazo or disazo compounds of the formula

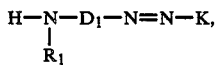 (15)

wherein $D_1$ is an arylene radical, for example a radical of the azobenzene, azonaphthalene or phenylazonaphthalene series or, preferably, an at most bicyclic arylene radical of the benzene or naphthalene series and K is the radical of a naphtholsulfonic acid or the radical of an enolised or enolisable ketomethylene compound (such as an acetoacetarylide or a 5-pyrazolone) with the OH group in the ortho-position to the azo group, and R is hydrogen or methyl. $D_1$ represents preferably a radical of the benzene series which contains a sulfonic acid group.

5. Monoazo or disazo compounds of the formula $$D_1—N=N—K_1—NHR_1,\qquad(16)$$

wherein $D_1$ is a radical of the types defined for $D_1$ in classes 1 and 2 above and $K_1$ is the radical of an enolisable ketomethylene compound (such as an acetoacetarylide or a 5-pyrazolone) with the OH group in the ortho-position to the azo group.

6. The metal complex compounds, for example the copper complexes, chromium complexes and cobalt complexes, of the dyes of the formulae (13) to (16), wherein each of $D_1$, K and $K_1$ has the indicated meaning, and furthermore a metallisable group (for example a hydroxyl, lower alkoxy or carboxylic acid group) is present in the ortho-position to the azo group in $D_1$.

EXAMPLES
Class 1

6-amino-1-hydroxy-2-(2'-sulfophenylazo)-naphthalene-3-sulfonic acid, 6-methylamino-1-hydroxy-2-(4'-accetylamino-2'-sulfophenylazo)-naphthalene-3-sulfonic acid, 8-amino-1-hydroxy-2-(2'-sulfophenylazo)-naphthalene-3,6-disulfonic acid, 8-amino-1-hydroxy-2-(4'-chloro-2'-sulfophenylazo)-naphthalene-3,5-disulfonic acid, 7-amino-2-(2',5'-disulfophenylazo)-1-hydroxynaphthalene-3-sulfonic acid, 7-methylamino-2-(2'-sulfophenylazo)-1-hydroxynaphthalene-3-sulfonic acid, 7-methylamino-2-(4'-methoxy-2'-sulfophenylazo)-1-hydroxynaphthalene-3-sulfonic acid, 8-(3'-aminobenzoylamino)-1-hydroxy-2-(2'-sulfophenylazo)-naphthalene-3,6-disulfonic acid, 8-amino-1-hydroxy-2,2'-azonaphthalene-1',3',5',6-tetrasulfonic acid, 8-amino-1-hydroxy-2,2'-azonaphthalene-1',3',5'-trisulfonic acid, 6-amino-1-hydroxy-2,2'-azonaphthalene-1',3,5'-trisulfonic acid, 6-methylamino-1-hydroxy-2,2'-azonaphthalene-1',3,5'-trisulfonic acid, 7-amino-1-hydroxy-2,2'-azonaphthalene-1',3-disulfonic acid, 8-amino-1-hydroxy-2-(4'-hydroxy-3'carboxyphenylazo)-naphthalene-3,6-disulfonic acid and 6-amino-1-hydroxy-2-(4'-hydroxy-3'-carboxyphenylazo)-naphthalene-3,5-disulfonic acid. Class 2

8-amino-1-hydroxy-2-[4'-(2''-sulfophenylazo)-2'-methoxy-5'-methylphenylazo]-naphthalene-3,6-disulfonic acid,

Class 2

8-amino-1-hydroxy-2-[4'-(4''-methoxyphenylazo)-2'-carboxyphenylazo]-naphthalene-3,6-disulfonic acid, 8-amino-1-hydroxy-2-[4'-(2''-hydroxy-3'',6''-disulfo-1''-naphthylazo)-2'-carboxyphenylazo]-naphthalene-3,6-disulfonic acid, 4,4'-bis-(8''-amino-1''-hydroxy-3'',6''-disulfo-2''-naphthylazo)-3,3'-diemthoxydiphenyl and 6-amino-1-hydroxy-2-[4'-(2''-sulfophenylazo)-2'-methoxy-5'-methylphenylazo]-naphthalene-3,5-disulfonic acid.

Class 3

2-(4'-amino-2'-methylphenylazo)-naphthalene-4,8-disulfonic acid, 2-(4'-amino-2'-acetylaminophenylazo)-naphthalene-5,7-disulfonic acid, 4-nitro-4'-(4''-methylaminophenylazo)-stilbene-2,2'-disulfonic acid,
4-nitro-4'-(4''-amino-2''-methyl-5''-methoxy-phelylazo)-stilbene-2,2'-disulfonic acid,
4-amino-4'-(4''-methoxyphenylazo)-stilbene-2,2'-disulfonic acid, and
4-amino-2-methylazobenzene-2',5'-disulfonic acid.

Class 4

1-(2',5'-dichloro-4'-sulfophenyl)-3-methyl-4-(3''-amino-4''-sulfophenylazo)-5-pyrazolone,
1-(4'-sulfophenyl)-3-carboxy-4-(4'-amino-3''-sulfophenylazo)-5-pyrazolone,
1-(2'-methyl-5'-sulfophenyl)-3-methyl-4-(4''-amino3''-sulfophenylazo)-5-pyrazolone,
1-(2'-sulfophenyl)-3-methyl-4-(3''-amino-4''-sulfophenylazo)-5-pyrazolone, 4-amino-4'-(3''-methyl-1''-phenyl-4''-pyrazol-5''-onylazo)-stilbene-2,2'-disulfonic acid,
4-amino-4'-(2''-hydroxy-3'',6''-disulfo-1''-naphthylazo)-stilbene-2,2'-disulfonic acid,
8-acetylamino-1-hydroxy-2-(3'-amino-4'-sulfophenylazo)-naphthalene-3,6-disulfonic acid,
7-(3'-sulfophenylamino)-1-hydroxy-2-(4'-amino-2'-carboxyphenylazo)-naphthalene-3-sulfonic acid,
8-phenylamino-1-hydroxy-2-(4''-amino-2'-sulfophenylazo)-naphthalene-3,6-disulfonic acid and
6-acetylamino-1-hydroxy-2-(5'-amino-2'-sulfophenylazo)-naphthalene-3-sulfonic acid.

Class 5

1-(3'-aminophenyl)-3-methyl-4-(2',5'-disulfophenylazo)-5-pyrazolone,
1-(3'-aminophenyl)-3-carboxy-4-(2'-carboxy-4'-sulfophenylazo)-5-pyrazolone,
4-amino-4'-[3''-methyl-4''-(2''',5''''-disulfophenylazo)-1''-pyrazol-5''-onyl]-stilbene-2,2'-disulfonic acid and
1-(3'-aminophenyl)-3-carboxy-4-[4''-(2''',5''''-disulfophenylazo)-2''-methoxy-5''-methylphenylazo]-5-pyrazolone.

Class 6

The copper complex of 8-amino-1-hydroxy-2-(2'-hydroxy-5''-suflophenylazo)-naphthalene-3,6-disulfonic acid,
the copper complex of 6-amino-1-hydroxy-2-(2'-hydroxy-5'-sulfophenylazo)-naphthalene-3-sulfonic acid,
the copper complex of 6-amino-1-hydroxy-b 2-(2'-hydroxy-5'-sulfophenylazo)-naphthalene-3,5-disulfonic acid,
the copper complex of 8-amino-1-hydroxy-2-(2'-hydroxy-3'-chloro-5'-sulfophenylazo)-naphthalene-3,6-disulfonic acid,
the copper complex of 6-methylamino-1-hydroxy-2-(2'-carboxy-5'-sulfophenylazo)-naphthalene-3-sulfonic acid,
the copper complex of 8-amino-1-hydroxy-2-[4'-(2''-sulfophenylazo)-2'-methyoxy-5'-methylphenylazo]-naphthalene-3,6-disulfonic acid,
the copper complex of 6-amino-1-hydroxy-2-[4'-(2'',5''-disulfophenylazo)-2'-methoxy-5'-methylphenylazo]-naphthalene-3,5-disulfonic acid,
the copper complex of 1-(3'-amino-4'-sulfophenyl)-3-methyl-4-[4''-(2''',5'''-disulfophenylazo)-2''-methoxy-5''-methylphenylazo]-5-pyrazolone,
the copper complex of 7-(4'-amino-3'-sulfoanilino)-1-hydroxy-2-[4''-(2''',5'''-disulfophenylazo)-2''-methoxy-5''-methylphenylazo]-naphthalene-3-sulfonic acid,
the copper complex of 6-(4'-amino-3'-sulfoanilino)-1-hydroxy-2-(2''-carboxyphenylazo)-naphthalene-3-sulfonic acid,
the 1,2-chromium complex of 7-amino-6'-nitro-1,2'-dihydroxy-2,1'-azonaphthalene-3,4-disulfonic acid,
the 1,2-chromium complex of 6-amino-1-hydroxy-2-(2'-corboxyphenylazo)-naphthalene-3-sulfonic acid,
the 1,2-chromium complex of 8-amino-1-hydroxy-2-(4'-nitro-2'-hydroxyphenylazo)-naphthalene-3,6-disulfonic acid,
the 1,2 cobalt complex of 6-(4'-amino-3'-sulfoanilino)-1-hydroxy-2-(5''-chloro-2'-hydroxyphenylazo)-naphthalene-3-sufonic acid,
the 1,2-chromium complex of 1-(3'-amino-4'-sulfophenyl)-3-methyl-4-(2''-hydroxy-4''-sulfo-1''-naphthylazo)-5-pyrazolone,
the 1,2-chromium complex of 7-(4'-sulfoanilino)-1-hydroxy-2-(4''-amino-2''-carboxyphenylazo)-naphthalene-3-sulfonic acid and
the 1,2-chromium complex of 1-(3'-aminophenyl)-3-methyl-4-(4''-nitro-2''-carboxyphenylazo)-5-pyrazolone.

Particularly important azo dyes which can be used for the production of the dyes of the formula (1) are the azo dyes of the formulae

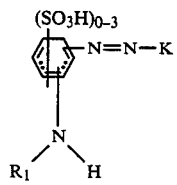
(17)

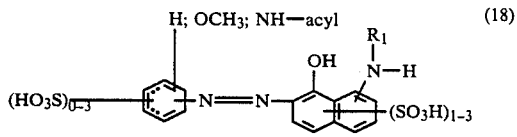
(18)

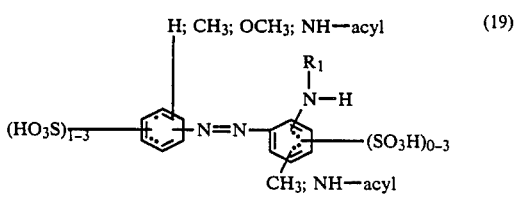
(19)

wherein K is the radical of a coupling component of the benzene, naphthalene or heterocyclic series, acyl is a low molecular aliphatic acyl radical of not more than 3 carbon atoms or an aromatic radical of not more than 8 carbon atoms and $R_1$ is as defined in formula (1), and the metal complex azo dyes of the formulae

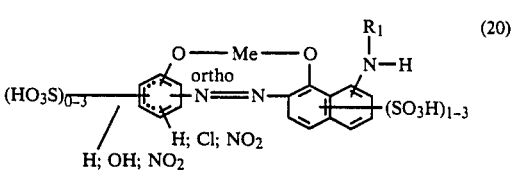
(20)

-continued

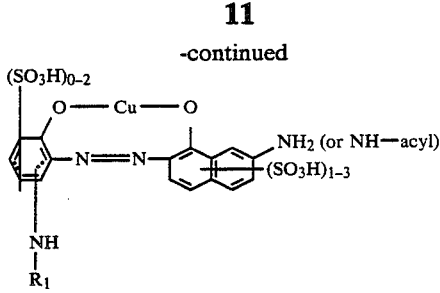

wherein $R_1$ and acyl are as defined in the formulae (17), (18) and (19) and Me represents Cu, Cr or Co.

7. Anthraquinone compounds which contain a group of the formula —$NHR_1$, wherein R is hydrogen or methyl, bonded to an alkylamino or arylamino group, which is itself bonded to the α-position of the anthraquinone nucleus, in particular of the formula

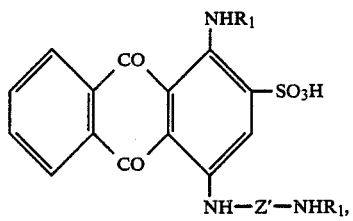

wherein the antraquinone nucleus can contain an additional sulphonic acid group in the 5-, 6-, 7- or 8-position and Z' is a bridge member which is preferably a divalent radical of the benzene series, for example a phenylene, diphenylene or 4,4'-stilbene or azobenzene radical. Preferably Z' should contain one sulfonic acid group for each benzene ring present.

Examples 1-amino-4-(4'-aminoalilino)-anthraquinone-2,3'-disulfonic acid and the corresponding 2,3',5-, 2,3',6- and 2,3',7-tri sulfonic acids, 1-amino-4-(4''-amino-4'-benzoylaminoaniline)-anthraquinone-2,3'-disulphonic acid and the corresponding 2,3'5-trisulfonic acid, 1-amino-4-[4'-(4''-aminophenylazo)-anilino]-anthraquinone-2,2'',5-trisulfonic acid, 1-amino-4-(4'-amino-3'-carboxyanilino)-anthraquinone-2,5-disulfonic acid, 1-amino-4-(3'-aminoanilino)-anthraquinone-2,4',5-trisulfonic acid and the corresponding 2,4-disulfonic acid, 1-amino-4-['-(4''-aminophenyl)-anilino]-anthraquinone-2,3'',5-trisulfonic acid, 1-amino-4-(4'-methylamino)-anilinoanthraquinone-2,3'-disulfonic acid and the corresponding 2,3',5-trisulfonic acid, 1-amino-4-(4'-n-butylamino)-anilinoanthraquinone-2,3'-disulfonic acid, 1-amino-4-(4'-methylamino-3'-carbocyanilino)-anthraquinone-2-sulfonic acid, 1-amino-4-(3'-β-hydroxyethylamino)-anlinoanthraquione-2,5-disulfonic acid, 1-(4'-aminoanilino)-anthraquinone-2,3'-disulfonic acid and 1-amino-4-(4'-amino-2'-methoxyanilino)-anthraquinone-2,3'-disulfonic acid.

8. Phthalocyanine compounds of the formula

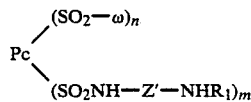

wherein Pc denotes a phthalocyanine nucleus, preferably copper phthalocyanine, ω is —OH and/or —$NH_2$, Z' is a bridge member, preferably an aliphatic, cycloaliphatic or aromatic bridge, and each of n and m is 1, 2 or 3 and can be identical or different, provided that the sum of n+m is not greater than 4.

The dye compounds of the phthalocyanine series which can be used as starting materials in the process of the invention are preperably metal-containing phthalocyanines, such as copper phthalocyanines, which contain at least one water-solubilising group, such as sulfonic acid group, and at least one group of the formula —$NHR_1$, wherein $R_1$ is a hydrogen atom or an alkyl group. The —$NHR_1$ group or groups can be bonded direct or through a divalent bridge to the benzene rings of the phthalocyanine nucleus, for example through a -phenylene-, —CO-phenylene-, —$SO_2$-phenylene-, —NH-phenylene-, —S-phenylene;, —O-phenylene-, —$CH_2$S-phenylene-, —$CH_2$O-phenylene-, —$CH_2$-phenylene-, —$SCH_2$-phenylene-, —$SO_2CH_2$-phenylene-, —$SO_2NR_1$-phenylene-. —$CH_2$—, —$SO_2NR_1$-arylene, —$NR_1$CO-phenylene, —$NR_1SO_2$-phenylene-, —$SO_2O$-phenylene-, —$CH_2$—, —$CH_2NR_1$-phenylene-, —$CH_2NH$—CO-phenylene-, —$SO_2NR_1$-alkylene-, —$CH_2NR_1$-alkylene-, —$CONR_1$-phenylene-, —$CONR_1$-arylene-, —$SO_2$— or —CO— bridge. In the above divalent bridge members, $R_1$ is a hydrogen atom, an alkyl or cycloalkyl group, arylene denotes a divalent aromatic radical which is unsubstituted or substituded, for example by halogen atoms, alkyl or alkoxy groups, and wherein the terminal bonds may be attached to identical or different nuclei, and alkylene denotes a divalent aliphatic radical which can include heteroatoms, such as nitrogen, in the chain of atoms, for example the radical —$CH_2CH_2$—NH—$CH_2CH_2$—.

As examples for such divalent aromatic radicals, which are referred to as arylene, there may be mentioned: aromatic nuclei, for example a benzene, naphthalene, acridine and carbazole nucleus, which can carry further substituents, and radicals of the formula

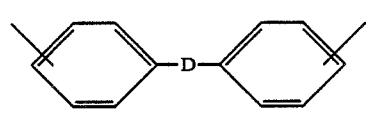

wherein the benzene rings can carry further substituents and —D— denotes a bridging group, for example —CH=CH—, —NH—, —S—, —O—, —$SO_2$—, —NO=N—, —NH—CO—NH—CO—NH—, —O—$CH_2CH_2$O— or

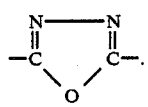

Examples 3-(3'-amino-4'-sulfophenyl)-sulfamyl-copper phthalocyanine-tri-3-sulfonic acid,
di-4-(3'-amino-4'-sulfophenyl)-sulfamyl-copper phthalocyanine-di-4-sulfonic acid,
3-(3'-aminophenylsulfamyl)-3-sulfamyl-copper phthalocyanine-di-3-sulfonic acid,
copper phthalocyanine-4-N-(4-amino-3-sulfophenyl)-sulfonamide-4',4'',4'''-trisulfonic acid,
cobalt phthalocyanine-4-4'-di-N-(4'-amino-4'-sulfophenyl)-carboxamide-4'',4'''-dicarboxylic acid, and copper-4-(4'-amino-3'-sulfobenzoyl)-phthalocyanine.

Mixtures of phthalocyanines can also be used. For example, a mixture of approximately equal parts of copper phthalocyanine-N-(4-amino-3-sulfophenyl)-sulfonamide-trisulfonic acid and copper phthalocyanine-di-N-(4-amino-3-sulfophenyl)-sulfonamide-disulfonic acid can be used.

9. Nitro dyes of the formula

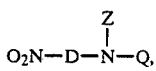 (26)

wherein D is a naphthalene or benzene nucleus which can be further substituted, the nitrogen atom N is in the ortho-position to the nitro group, Z is a hydrogen atom or an unsubstituted or substituted hydrocarbon radical and Q is a hydrogen atom or an organic radical bonded to the nitrogen through a carbon atom, and wherein Q and Z are not both hydrogen atoms, and Q can be bonded to Z, if Z is a hydrocarbon radical, or can be bonded to D in the ortho-position to the nitrogen atom N to form a heterocyclic ring, and which contain at least one group of the formula $-NHR_1$, wherein $R_1$ is hydrogen or methyl, in particular nitro dyes of the formula

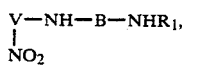 (27)

wherein V and B are monocyclic aryl nuclei and the nitro group in V is the ortho-position to the NH group.

Example

4-Amino-2'nitro-diphenylamine-3,4'-disulfonic acid.
9. Metal complexes of formazane dyes of the formula

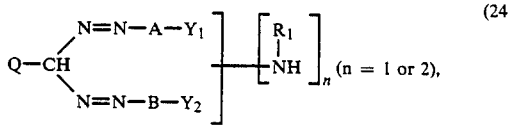 (24)

wherein Q is an organic radical, a nitro or cyano group, A and B are radicals of diazo components of the benzene, naphthalene or heterocyclic series and each of $Y_1$ and $Y_2$ is a substituent which is bound in the ortho-position to the azo group and which is able to form a complex with a heavy metal, and R has the indicated meaning. The radical Q is especially a radical of the benzene series, such as phenyl or sulfophenyl, or a low molecular alkyl group, such as a methyl group, a low molecular alkanoyl group, a low molecular, preferably $C_1$-$C_4$-carbalkoxy group, a benzoyl group or a heterocyclic radical, and A and B are preferably phenyl radicals which are substituted by sulfo, sulfonamido or alkylsulfonyl groups. Suitable substituents $Y_1$ and $Y_2$ are above all the hydroxyl and carboxyl groups. Suitable heavy metals are copper, chromium, cobalt and nickel.

Examples the copper complex of 2'-carboxy-2"-hydroxy-3"-amino-1,3,5-triphenylformazane-4',5",3'"-trisulfonic acid, the copper complex of 2',2"-dihydroxy-3'-amino-5'-methylsulfonyl-1.3,5-triphenyl-3",5", 4'"-trisulfonic acid, the copper complex of 2'-carboxy-4'-amino-2"-hydroxy-1,3,5-triphenylformazane-3",5",2'"-trisulfonic acid, the copper complex of 2'-hydroxy-2"-carboxy-4'"-amino-1,3,5-triphenylformazane-4'-4"-disulfonic acid, the copper complex of 2',2"-dihydroxy-5"-amino-1,5-diphenyl-3-methylformazane-5',3"-disulfonic acid, the copper complex of 2',2"-dihydroxy-5'-amino-1,3,5-triphenylformazane-3'-3",5"-trisulfonic acid, the copper complex of 2'-carboxy-3'-amino-2"-hydroxy-3'"(1""-phenyl-3""-methyl-pyrazol-5""-onyl-4""-azo)-1,3,5-trophenylformazane-3",5",2"",5""-tetrasulfonic acid.

the nickel complex of 2',2"-dicarboxy-1,5-diphenyl-3-(m-aminobenzoyl)-formazane-4',4"-disulfonic acid.

(c) Aminobenzenes of the formula (7)

N-ethylaminobenzene
N-propylaminobenzene,
N-n-butylaminobenzene,
3-ethylaminobenzene,
3-n-butylaminobenzene,
2-ethylamino-1-methylbenzene.

Examples of starting materials which can be used in the production of the preferred dyes of the formula (2) are:

Diazotisable amino compounds of the formula (8) (diazo components)

1-aminebenzene-2-, -3- and -4-sulfonic acid,
1-aminobenzene-2,4- and -2,5-disulfonic acid,
1-amino-4-methylbenzene-2-sulfonic acid,
1-amino-3-methylbenzene-6-sulfonic acid,
1-amino-6-methylbenzene-3- or -4-sulfonic acid,
1-amino-2,4-dimethylbenzene-6-sulfonic acid,
1-amino-2-carboxybenzene-4-sulfonic acid,
1-amino-4-carboxybenzene-2-sulfonic acid,
1-amino-4- or -5-chlorbenzene-2-sulfonic acid,
1-amino-6-chlorobenzene-3- or -4-sulfonic acid,
1-amino-3,4-dichlorobenzene-6-sulfonic acid,
1-amino,2,5-dichlorobenzene-4-sulfonic acid,
1-amino-4-methyl-5-chlorobenzene-2-sulfonic acid,
1-amino-5-methyl-4-chlorobenzene-2-sulfonic acid,
1-amino-4- or -5-methoxybenzene-2-sulfonic acid,
1-amino-6-methoxybenzene-3- or -4-sulfonic acid,
1-amino-6-ethoxybenzene-3- or -4-sulfonic acid,
1-amino-2,4-dimethoxybenzene-6-sulfonic acid,
1-amino-2,5-dimethoxybenzene-4-sulfonic acid,
1-amino-3-acetylaminobenzene-6-sulfonic acid,
1-amino-4-acetylaminobenzene-2-sulfonic acid,
1-amino-3-acetylamino-4-methylbenzene-6-sulfonic acid,
1-aminonaphthalene-2-, -4-, -5-, -6-, -7- or -8-sulfonic acid,
2-aminonaphthalene-1-, -5- or -6-sulfonic acid,
1-aminonaphthalene-3,6- or -5,7-disulfonic acid,
2-aminonaphthalene-1,5-, -1,7-, -3,6-, -5,7-, -4,8- or -6,8-disulfonic acid,
1-aminonaphthalene-2,5,7-trisulfonic acid,
2-aminonaphthalene-1,5,7-, -3,6,8- of 4,6,8-trisulfonic acid,
1-hydroxy-2-aminobenzene-4-sulfonic acid,
1-hydroxy-2-aminobenzene-5-sulfonic acid,
1-hydroxy-2-aminobenzene-4,6-disulfonic acid, 1-hydroxy-2-amino-4-acetylaminobenzene-6-sulfonic acid,
1-hydroxy-2-amino-6-acetylaminobenzene-4-sulfonic acid,
1-hydroxy-2-amino-4-chlorobenzene-5-sulfonic acid,
1-hydroxy-2-amino-4-methylsulfonyl-benzene,
1-amino-2-hydroxy-6-nitronaphthalene-4-sulfonic acid,
2-amino-1-hydroxynaphthalene-4,8-disulfonic acid.

Coupling components of the formula (9)

2-amino-5-hydroxynaphthalene-7-sulfonic acid,
2-methyl- or -ethylamino-5-hydroxynaphthalene-7-sulfonic acid,
2-(N-acetyl-N-methylamino)-5-hydroxynaphthalene-7-sulfonic acid,
2-acetylamino-5-hydroxynaphthalene-7-sulfonic acid,
2-amino-5-hydroxynaphthalene-1,7-disulfonic acid,
2-amino-8-hydroxynaphthalene-6-sulfonic acid,
2-methyl- or -ethylamino-8-hydroxynaphthalene-6-sulfonic acid,
2-(N-acetyl-N-methylamino)-8-hydroxynaphthalene-6-sulfonic acid,
2-acetylamino-8-hydroxynaphthalene-6-sulfonic acid,
2-amino-8-hydroxynaphthalene-3,6-disulfic acid,
2-acetylamino-8-hydroxynaphthalene-3,6-disulfonic acid,
1-amino-5-hydroxynaphthalene-7-sulfonic acid,
1-amino-8-hydroxynaphthalene-3,6- or -4,6-disulfonic acid,
1-acetylamino-8-hydroxynaphthalene-3,6- or -4,6-disulfonic acid,
1-(4'-aminobenzoylamino)-8-hydroxynaphthalene,3,6- or -4,6-disulfonic acid,
1-(4'-nitrobenzoylamino)-8-hydroxynaphthalene, 3,6- or -4,6-disulfonic acid,
1-(3'-aminobenzoylamino)-8-hydroxynaphthalene-3,6- or -4,6-disulfonic acid,
1-(3'-nitrobenzoylamino)-8-hydroxynaphthalene-3,6- or 4,6-disulfonic acid,
2-(4'-amino-3'-sulfophenylamino)-5-hydroxynaphthalene-7-sulfonic acid.

Suitable aminobenzenes of the formula (10) are the same as those referred to above as aminobenzenes of the formula (7).

In the production of the preferred dyes of the formula (1), wherein D is the radical of an azo dye, especially of a monoazo or disazo dye, the diazotisation of the intermediates which contain a diazotisable amino group in usually effected by treatment with nitrous acid in an aqueous solution of a mineral acid at low temperature, and the coupling is carried out at weakly acid or neutral to weakly alkaline pH values.

The condensation of the 2,4,6-trifluoro-1,3,5-triazine with the coupling components of the formula (9), the azo compounds of the formula (11) and the aminobenzenes of the formula (10) is carried out preferably in aqueous solution or suspension, at low temperature and at a weakly acid or neutral to weakly alkaline pH value. The hydrogen fluoride which is set free during the condensation is advantageously neutralised continuously by the addition of aqueous alkali hydroxides, carbonates or bicarbonates.

If the benzene or naphthalene radical A contains a complex-forming group in the ortho-position to the azo group, for example a hydroxyl or carboxyl group, it is also possible to obtain metal complexes of the fiber-reactive azo dyes of the formula (2) by treating azo compounds of the formula (11), wherein A is a benzene or naphthalene radical which contains a complex-forming group in the ortho-position to the azo group, with metal donors before or, if desired, also after the acylation with the 2,4,6-trifluoro-1,3,5-triazine.

Copper complexes of azo dyes of the formula (2) are of particular interest. A suitable method of metallation, in addition to that described above, is also that of dealkylating metallation and, for the production of copper complexes, oxidative coppering.

The dyes of the formula (1) are new. They are distinguished by high reactivity and produce dyeings having good wet- and lightfastness properties. It is to be particularly mentioned that dyes containing substantive chromopheric groups possess outstanding solubility whilst having good exhaust and fixation properties. This feature is surprising, as usually the solubility can only be improved by introducing additional sulfo groups into the dye molecule.

The dyes of the formula (1) are suitable for dyeing and printing a very wide variety of materials, such as silk, leather, wool, polyamide fibres and polyurethanes, but especially cellulosic materials of fibrous structure, such as linen, cellulose, regenerated cellulose, and especially cotton. They are suitable both for dyeing by the exhaust method and for dyeing by the pad-dyeing process, in which the goods are impregnated with aqueous and, if desired, also with salt containing dye solutions, and the dyes are fixed after treatment with alkali or in the presence of alkali, with or without the application of heat.

They are also suitable for printing, in particular on cotton, and also for printing nitrogen-containing fibres, for example wool, silk or blends containing wool.

It is advisable to rinse the dyeings and prints thoroughly with cold and hot water, if appropriate with the addition of an agent which acts as a dispersant and promotes the diffusion of non-fixed dye.

In the following Examples, the parts and percentages are by weight.

EXAMPLE 1

45.3 parts of 2-amino-6-(4'-methoxy-2'-sulfophenylazo)-5-hydroxynaphthalene-7-sulfonic acid (prepared by coupling diazotised 1-amino-4-methoxybenzene-2-sulfonic acid to 2-amino-5-hydroxynaphthalene-7-sulfonic acid) are dissolved neutral in 600 parts of water. The solution is cooled to 0°--5° C. by adding ice and, at this temperature, 14.2 parts of 2,4,6-trifluoro-1,3,5-triazine are added dropwise in the course of 30 minutes while keeping the pH of the reaction mixture at 5.5-6 by simultaneously adding sodium hydroxide solution. The reaction course is followed by chromatography. As soon as no more starting material can be detected, 12.7 parts of N-ethylaminobenzene are added. A pH of 7 is kept by continuously neutralising the hydrogen fluoride set free during the reaction and raising the temperature to 20° C. When the reaction is complete, the reactive dye of the formula

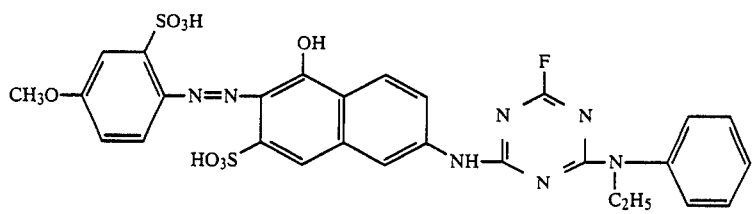

is salted out, collected by filtration, washed and dried in vacuo. It is a red powder which dyes cotton and regenerated cellulose in clear scarlet shades of good wet- and lightfastness and good fastness to rubbing.

Further dyes having similar properties are obtained by condensing the aminoazo dyes of column 1 in Table 1 with equivalent parts of 2,4,6-trifluoro-1,3,5-triazine and immediately thereafter with the amines of column 2 in accordance with the particulars of this Example.

TABLE 1

| No. | Amino dye | Amine | Shade on cotton |
|---|---|---|---|
| 1 | 2-aminonaphthalene-4,8-disulfonic acid ⟶ 1-amino-3-acetylaminobenzene | N—ethylaminobenzene | yellow |
| 2 | 2-aminonaphthalene-4,8-disulfonic acid ⟶ 1-amino-3-methylbenzene | N—propylaminobenzene | yellow |
| 3 | 2-aminonaphthalene-4,8-disulfonic acid ⟶ 3-aminophenylurea | N—n-butylaminobenzene | yellow |
| 4 | 2-aminonaphthalene-3,6,8-trisulfonic acid ⟶ 3-aminophenylurea | N—ethylaminobenzene | yellow |
| 5 | 2-aminonaphthalene-3,6,8-trisulfonic acid ⟶ 1-amino-3-acetylaminobenzene | N—n-butylaminobenzene | yellow |
| 6 | 2-aminonaphthalene-4,6,8-trisulfonic acid ⟶ 1-amino-3-acetylaminobenzene | 3-ethylamino-1-methylbenzene | yellow |
| 7 | 1-aminobenzene-4-sulfonic acid ⟶ 1-aminonaphthalene-6-sulfonic acid ⟶ 1-aminonaphthalene-8-sulfonic acid | N—ethylaminobenzene | brownish yellow |
| 8 | 1-aminobenzene-2,5-disulfonic acid ⟶ 1-aminonaphthalene-6-sulfonic acid ⟶ 1-aminonaphthalene-8-sulfonic acid | 4-ethylamino-1-methylbenzene | reddish brown |
| 9 | 4-aminoazobenzene-3,4'-disulfonic acid ⟶ 1-aminonaphthalene-6-sulfonic acid | N—propylaminobenzene | yellowish brown |
| 10 | 1-amino-3-acetylaminobenzene-6-sulfonic acid ⟶ 1-ethyl-3-sulfomethyl-4-methyl-6-hydroxypyridone-(2)-5-carboxamide (saponified) | N—ethylaminobenzene | greenish yellow |
| 11 | 1,4-diaminobenzene-2,5-disulfonic acid ⟶ 1-ethyl-3-sulfomethyl-4-methyl-6-hydroxypyridone-(2)-5-carboxamide (saponified) | N—ethylaminobenzene | yellow |
| 12 | 1-amino-3-acetylaminobenzene-6-sulfonic acid ⟶ 1-ethyl-3-aminocarbonyl-4-methyl-6-hydroxypyridone-(2) | N—propylaminobenzene | yellow |
| 13 | 1-amino-3-acetylaminobenzene-6-sulfonic acid ⟶ 1-(2',5'-dichloro-4'-sulfophenyl)-3-methyl-5-pyrazolone (saponified) | N—ethylaminobenzene | yellow |
| 14 | 1-amino-3-acetylaminobenzene-6-sulfonic acid ⟶ 1-(4',8'-disulfonaphthyl-[2'])-3-methyl-5-pyrazolone (saponified) | N—ethylaminobenzene | yellow |
| 15 | 1-aminobenzene-2-sulfonic acid ⟶ 2-acetylamino-5-hydroxynaphthalene-7-sulfonic acid (saponified) | N—ethylaminobenzene | orange |
| 16 | 1-aminobenzene-2-sulfonic acid ⟶ 2-(N—acetyl-N—methylamino)-5-hydroxynaphthalene-7-sulfonic acid (saponified) | N—n-butylaminobenzene | orange |
| 17 | 1-amino-4-methylbenzene-2.sulfonic acid ⟶ 2-acetylamino-5-hydroxynaphthalene-7-sulfonic acid (saponified) | 4-ethylamino-1-methylbenzene | orange |
| 18 | 1-aminobenzene-2,5-disulfonic acid ⟶ 2-acetylamino-5-hydroxynaphthalene-7-sulfonic acid (saponified) | N—ethylaminobenzene | orange |
| 19 | 1-aminobenzene-2,4-disulfonic acid ⟶ 2-(N—acetyl-N—methylamino-5-hydroxynaphthalene-7-sulfonic acid | N—n-butylaminobenzene | orange |

TABLE 1-continued

| No. | Amino dye | Amine | Shade on cotton |
|---|---|---|---|
| 20 | 1-amino-2-methylbenzene-4,6-disulfonic acid ⟶ 2-acetylamino-5-hydroxynaphthalene-7-sulfonic acid (saponified) | N—propylaminobenzene | orange |
| 21 | 1-aminobenzene-2-sulfonic acid ⟶ 2-amino-5-hydroxynaphthalene-1,7-disulfonic acid | N—ethylaminobenzene | orange |
| 22 | 1-amino-2-carboxybenzene-4-sulfonic acid ⟶ 2-amino-5-hydroxynaphthalene-1,7-disulfonic acid | 3-n-butylamino-1-methylbenzene | orange |
| 23 | 2-aminonaphthalene-1,5-disulfonic acid ⟶ 2-acetylamino-5-hydroxynaphthalene-7-sulfonic acid (saponified) | N—ethylaminobenzene | reddish orange |
| 24 | 2-aminonaphthalene-1,5-disulfonic acid ⟶ 2-(N—acetyl-N—methylamino)-5-hydroxynaphthalene-7-sulfonic acid (saponified) | 2-ethylamino-1-methylbenzene | reddish orange |
| 25 | 2-aminonaphthalene-1,5,7-trisulfonic acid ⟶ 1-acetylamino-5-hydroxynaphthalene-7-sulfonic acid (saponified) | N—ethylaminobenzene | orange |
| 26 | 1-amino-4-methoxybenzene-2-sulfonic acid ⟶ 2-amino-5-hydroxynaphthalene-7-sulfonic acid | 2-ethylamino-1-methylbenzene | scarlet |
| 27 | 1-amino-4-methoxybenzene-2,5-disulfonic acid ⟶ 2-amino-5-hydroxynaphthalene-7-sulfonic acid | 2-ethylamino-1-methylbenzene | scarlet |
| 28 | 1-amino-4-acetylaminobenzene-2-sulfonic acid ⟶ 2-amino-5-hydroxynaphthalene-7-sulfonic acid | 2-ethylamino-1-methylbenzene | scarlet |
| 29 | 2-aminonaphthalene-3,6,8-trisulfonic acid ⟶ 2-acetylamino-5-hydroxynaphthalene-7-sulfonic acid | 2-ethylamino-1-methylbenzene | scarlet |
| 30 | 1-amino-4-methoxybenzene-2-sulfonic acid ⟶ 2-amino-8-hydroxynaphthalene-6-sulfonic acid | N—ethylaminobenzene | yellowish red |
| 31 | 1-amino-4-methoxybenzene-2-sulfonic acid ⟶ 2-amino-8-hydroxynaphthalene-6-sulfonic acid | N—n-butylaminobenzene | yellowish red |
| 32 | 2-aminonaphthalene-1,5-disulfonic acid ⟶ 2-acetylamino-8-hydroxynaphthalene-6-sulfonic acid (saponified) | N—ethylaminobenzene | yellowish red |
| 33 | 2-aminonaphthalene-1,5-disulfonic acid ⟶ 2-acetylamino-8-hydroxynaphthalene-6-sulfonic acid (saponified) | N—propylaminobenzene | yellowish red |
| 34 | 1-aminobenzene-2-sulfonic acid ⟶ 1-(4'-nitrobenzoylamino)-8-hydroxynaphthalene-3,6-disulfonic acid (reduced) | N—ethylaminobenzene | red |
| 35 | 1-aminobenzene-2-sulfonic acid ⟶ 1-(4'-nitrobenzoylamino)-8-hydroxynaphthalene-3,6-disulfonic acid (reduced) | 2-ethylamino-1-methylbenzene | red |
| 36 | 1-aminobenzene-2-sulfonic acid ⟶ 1-(3-nitrobenzoylamino)-8-hydroxynaphthalene-3,6-disulfonic acid (reduced) | N—ethylaminobenzene | red |
| 37 | 1-aminobenzene-2,5-disulfonic acid ⟶ 1-(4'-nitrobenzoylamino)-8-hydroxynaphthalene-3,6-disulfonic acid (reduced) | N—ethylaminobenzene | red |
| 38 | 1-aminobenzene-2,5-disulfonic acid ⟶ 1-(4'-nitrobenzoylamino)-8-hydroxynaphthalene-3,6-disulfonic acid (reduced) | N—propylaminobenzene | red |
| 39 | 1-aminobenzene-2,4-disulfonic acid ⟶ 1-(4'-nitrobenzoylamino)-8-hydroxynaphthalene-4,6-disulfonic acid (reduced) | 4-ethylamino-1-methylbenzene | red |
| 40 | 2-aminonaphthalene-1,5-disulfonic acid ⟶ 1-(4'nitrobenzoylamino)-8-hydroxynaphthalene-3,6-disulfonic acid (reduced) | N—ethylaminobenzene | red |
| 41 | 2-aminonaphthalene-1,5-disulfonic acid ⟶ 1-(4'nitrobenzoylamino)-8-hydroxynaphthalene-3,6-disulfonic acid (reduced) | N—n-butylaminobenzene | red |
| 42 | 2-aminonaphthalene-1,5-disulfonic acid ⟶ 1-(3'nitrobenzoylamino)-8-hydroxynaphthalene-3,6-disulfonic acid (reduced) | N—ethylaminobenzene | red |

TABLE 1-continued

| No. | Amino dye | Amine | Shade on cotton |
|---|---|---|---|
| 43 | 2-aminonaphthalene-1,5-disulfonic acid⟶<br>1-(4'nitrobenzoylamino)-8-hydroxynaphthalene-4,6-disulfonic acid<br>(reduced) | N—ethylaminobenzene | red |
| 44 | 1-hydroxy-2-aminobenzene-4-sulfonic acid⟶<br>2-amino 7-hydroxynaphthalene-7-sulfonic acid<br>(Cu-complex) | N—ethylaminobenzene | deep purplish red |
| 45 | 1-hydroxy-2-aminobenzene-5-sulfonic acid⟶<br>2-methylamino-5-hydroxynaphthalene-7-sulfonic acid<br>(Cu-compl.) | 3-ethylamino-1-methylbenzene | deep purplish red |
| 46 | 1-hydroxy-2-aminobenzene-4,6-disulfonic acid⟶<br>2-amino-7-hydroxynaphthalene-7-sulfonic acid<br>(Cu-compl.) | N—ethylaminobenzene | deep purplish red |
| 47 | 1-hydroxy-2-aminobenzene-4,6-disulfonic acid⟶<br>2-amino-8-hydroxynaphthalene-6-sulfonic acid<br>(Cu-complex) | N—propylaminobenzene | deep purplish red |
| 48 | 1-hydroxy-2-aminobenzene-5-sulfonic acid⟶<br>1-amino-8-hydroxynaphthalene-3,6-disulfonic acid<br>(Cu-complex) | N—ethylaminobenzene | violet |
| 49 | 1-hydroxy-2-aminobenzene-4,6-disulfonic acid⟶<br>1-amino-8-hydroxynaphthalene-3,6-disulfonic acid<br>(Cu-complex) | 3-n-butylamino-1-methylbenzene | violet |
| 50 | 2-amino-1-hydroxynaphthalene-4,8-disulfonic acid⟶<br>1-amino-8-hydroxynaphthalene-3,6-disulfonic acid<br>(Cu-complex) | N—ethylaminobenzene | blue |
| 51 | 1-amino-2-hydroxy-6-nitronaphthalene-4-sulfonic acid⟶<br>1-amino-8-hydroxynaphthalene-2,4-disulfonic acid, reduced<br>(Cu-complex) | N—ethylaminobenzene | blue |
| 52 | 1-hydroxy-2-amino-4-acetylaminobenzene-6-sulfonic acid⟶<br>1-amino-8-hydroxynaphthalene-2,4-disulfonic acid, saponified<br>(Cu-complex) | n-propylaminobenzene | blue |
| 53 | 1-hydroxy-2-amino-6-acetylaminobenzene-4-sulfonic acid⟶<br>1-amino-8-hydroxynaphthalene-2,4-disulfonic acid, saponified<br>(Cu-complex) | N—ethylaminobenzene | blue |
| 54 | 1-amino-2-methylbenzene-4-sulfonic acid⟶<br>1-amino-2-hydroxy-5-methylbenzene⟶<br>1-amino-8-hydroxy-naphthalene-4,6-disulfonic acid<br>(Cu-complex) | 3-ethylamino-1-methylbenzene | blue |
| 55 | 1-amino-2-methylbenzene-4-sulfonic acid⟶<br>1-amino-2-hydroxy-5-methylbenzene⟶<br>1-amino-8-hydroxy-naphthalene-4,6-disulfonic acid<br>(Co-complex) | N—propylaminobenzene | grey |
| 56 | 1-amino-2-methylbenzene-4-sulfonic acid⟶<br>1-amino-2-hydroxy-5-methylbenzene⟶<br>1-amino-8-hydroxy-naphthalene-4,6-disulfonic acid<br>(Cr-complex) | N—n-butylaminobenzene | greenish black |
| 57 | 1-amino-2-chlorobenzene-4-sulfonic acid⟶<br>1-hydroxy-2-acetylaminobenzene (saponified)⟶<br>1-amino-8-hydroxynaphthalene-3,6-disulfonic acid<br>(Cu-complex) | 3-ethylamino-1-methylbenzene | navy blue |
| 58 | 1-amino-2-chlorobenzene-4-sulfonic acid⟶<br>1-hydroxy-2-acetylaminobenzene (saponified)⟶<br>1-amino-8-hydroxynaphthalene-3,6-disulfonic acid<br>(Co-complex) | 3-ethylamino-1-methylbenzene | grey |
| 59 | 2-aminonaphthalene-4,8-disulfonic acid⟶<br>2-hydroxy-3-aminonaphthalene-5,7-disulfonic acid<br>(coppered by oxidation) | N—ethylaminobenzene | blue |
| 60 | 3-methoxy-4-amino-6-methyl-azobenzene-2',5'-disulfonic acid⟶<br>2-methylamino-5-hydroxynaphthalene-7-sulfonic acid<br>(coppered by dimethylation) | N—ethylaminobenzene | navy blue |
| 61 | N—(2-carboxy-4-sulfophenyl)-N'—(2'-hydroxy-3'-amino-5'-sulfophenyl)-<br>ms-phenylformazane (Cu-complex) | N—ethylaminobenzene | blue |
| 62 | N—(2-carboxy-5-sulfophenyl)-N'—(2'-hydroxy-3'-amino-5'-sulfophenyl)-<br>ms-phenylformazane (Cu-complex) | N—ethylaminobenzene | blue |
| 63 | N—(2-carboxy-4-sulfophenyl)-N'—(2'-hydroxy-3'-amino-5'-sulfophenyl)-<br>ms-(2"-chloro-5"-sulfophenyl)-formazane (Cu-complex) | 2-ethylamino-1-methylbenzene | blue |
| 64 | N—(2-carboxy-4-aminophenyl)-N'—(2'-hydroxy-3',5'-disulfophenyl)-<br>ms-(3"-sulfophenyl)-formazane (Cu-complex) | N—ethylaminobenzene | blue |

TABLE 1-continued

| No. | Amino dye | Amine | Shade on cotton |
|---|---|---|---|
| 65 | N—(2-carboxy-4-aminophenyl)-N'—(2'-hydroxy-3',5'-disulfophenyl)-ms-(2''-sulfophenyl)-formazane (Cu-complex) | N—ethylaminobenzene | blue |
| 66 | N—(2-carboxy-5-sulfophenyl)-N'—(2'-hydroxy-5'-amino-3'-sulfophenyl)-ms-(4'-sulfophenyl)-formazane (Cu-complex) | 1-ethylamino-1-methylbenzene | blue |
| 67 | N—(2-carboxy-5-sulfophenyl)-N'—(2'-hydroxy-3',5'-disulfophenyl)-ms-(3''-aminophenyl)-formazane (Cu-complex) | 1-ethylamino-1-methylbenzene | greenish blue |
| 68 | N—(2-carboxy-5-sulfophenyl)-N'—(2'-hydroxy-4'-methylsulfonyl-6'-sulfophenyl)-ms-(3''-aminophenyl)-formazane (Cu-complex) | 3-ethylamino-1-methylbenzene | blue |
| 69 | N—(2-carboxy-4-aminophenyl)-N'—(2'-hydroxy-4'-sulfonaphth-1'-yl)-ms-(2''-sulfophenyl)-formazane (Cu-complex) | 3-ethylamino-1-methylbenzene | blue |
| 70 | N—(2-hydroxy-3-amino-5-sulfophenyl)-N'—(2'-hydroxy-4'-sulfophenyl)-ms-(2''-sulfophenyl)-formazane (Cu-complex) | N—ethylaminobenzene | navy blue |
| 71 | N—(2-hydroxy-5-sulfophenyl)-N'—(2'-hydroxy-3',5'-disulfophenyl)-ms-(4''-aminophenyl)-formazane (Cu-complex) | N—propylaminobenzene | blue |
| 72 | N—(2-hydroxy-5-amino-3-sulfophenyl)-N'—(2',5'-disulfophenyl)-ms-phenylformazane (Cu-complex) | N—n-butylaminobenzene | blue |
| 73 | N—(2-hydroxy-4,6-disulfophenyl)-N'—(2',4'-disulfophenyl)-ms-(3''-aminophenyl)-formazane (Cu-complex) | 3-n-butylamino-1-methylbenzene | blue |
| 74 | N—(2-hydroxy-4-sulfophenyl)-N'—(4'-amino-2'-sulfophenyl)-ms-(4''-chloro-3''-sulfophenyl)-formazane (Cu-complex) | 2-ethylamino-1-methylbenzene | blue |
| 75 | 1-amino-4-(4'-N—methylaminomethyl-anilino)-anthraquinone-2,2'-disulfonic acid | N—ethylaminobenzene | blue |
| 76 | 1-amino-4-(4'-N—methylaminomethyl-anilino)-anthraquinone-2,2',6-trisulfonic acid | N—propylaminobenzene | greenish blue |
| 77 | 1-amino-4-(4'-methyl-2'-aminomethyl-anilino)-anthraquinone-2,6'-disulfonic acid | 4-ethylamino-1-methylbenzene | reddish blue |
| 78 | 1-amino-4-(4'-aminocyclohexylamino)-anthraquinone-2,5,8-trisulfonic acid | 3-ethylamino-1-methylbenzene | blue |
| 79 | 1-amino-4-(4'-amino-anilino)-anthraquinone-2,6,2'-trisulfonic acid | N—ethylaminobenzene | blue |
| 80 | 1-amino-4-(3'-amino-anilino)-anthraquinone-2,6,2'-disulfonic acid | N—ethylaminobenzene | blue |
| 81 | 1-amino-4-(3'-amino-anilino)-anthraquinone-2,4'-disulfonic acid | N—ethylaminobenzene | blue |
| 82 | 1-amino-4-(4'-amino-anilino)-anthraquinone-2,3'-disulfonic acid | N—ethylaminobenzene | greenish blue |
| 83 | 1-amino-4-(2'-methyl-3'-amino-anilino)-anthraquinone-2,5',6-trisulfonic acid | N—ethylaminobenzene | blue |
| 84 | 1-amino-4-(3'-amino-2'-methyl-anilino)-anthraquinone-2,3'-disulfonic acid | N—ethylaminobenzene | blue |
| 85 | 1-amino-4-(3'-amino-2',4',6'-trimethyl-anilino)-anthraquinone-2,5'-disulfonic acid | N—ethylaminobenzene | blue |
| 86 | Cu—Pc—(3) with (SO$_3$H)$_2$, SO$_2$NH$_2$, SO$_2$NH—C$_6$H$_4$—NH$_2$ (meta) | N—ethylaminobenzene | turquoise blue |
| 87 | Ni—Pc—(3) with (SO$_3$H)$_2$, SO$_2$NH$_2$, SO$_2$NH—C$_6$H$_4$—NH$_2$ (meta) | N—ethylaminobenzene | turquoise blue |
| 88 | Cu—Pc—(3) with (SO$_3$H)$_2$, SO$_2$NH$_2$, SO$_2$NH—C$_6$H$_4$—NH$_2$ (para) | N—ethylaminobenzene | turquoise blue |

TABLE 1-continued

| No. | Amino dye | Amine | Shade on cotton |
|---|---|---|---|
| 89 | Cu—Pc—(3) [—(SO₃H)₂₋₇] [—SO₂NH₂—C₆H₃(NH₂)]₁₋₃ | 4-ethylamino-1-methylbenzene | turquoise blue |
| 90 | Cu—Pc—(3) [—SO₃H / —SO₂NH₂]_{ca. 2-6} [—SO₂NH—C₆H₃(SO₃H)(NH₂)]_{ca. 1-4} | N—ethylaminobenzene | turquoise blue |
| 91 | Cu—Pc—(4) [—SO₃H / —SO₂NH₂]_{ca. 2-6} [—SO₂NH—C₆H₃(SO₃H)(NH₂)]_{ca. 1-4} | N—ethylamino-1-methylbenzene | turquoise blue |
| 92 | Cu—Pc—(3) [—(SO₃H)₂] [—SO₂NH—C₆H₄—NH₂]₁ | N—ethylaminobenzene | turquoise blue |
| 93 | Ni—Pc—(3) [—(SO₃H)₂] [—SO₂NH—C₆H₄—NH₂]₁ | N—ethylaminobenzene | turquoise blue |
| 94 | Ni—Pc—(3) [—(SO₃H)₃] [—SO₂NH—C₆H₄—NH₂]₁ | N—ethylaminobenzene | turquoise blue |
| 95 | Cu—Pc—(3) [—(SO₃H)₂] [—(SO₂NHCH₂CH₂NH₂)]₁ | N—propylaminobenzene | turquoise blue |

TABLE 1-continued

| No. | Amino dye | Amine | Shade on cotton |
|---|---|---|---|
| 96 | Cu—Pc—(3) ┤ (SO₃H)₂ / (SO₂NH₂)₁ / (SO₂NHCH₂CH₂NH₂)₁ | N—ethylaminobenzene | turquoise blue |

EXAMPLE 2

While cooling with ice, 28 parts of concentrated hydrochloric acid are added to a solution of 34.7 parts of 2-aminonaphthalene-4,8-disulfonic acid (sodium salt) and 7 parts of sodium nitrite in 300 parts of water, and the mixture is stirred for 30 minutes at 0°–10° C. After removal of excess nitrous acid, 15 parts of 3-amino- condensation is carried out at the above pH while raising the temperature to 20° C. When the reaction (which is followed by chromatography) is complete, 30 parts of diazotised 2-aminonaphthalene-1,5-disulfonic acid, suspended in 400 parts of water, are added to the resulting solution of the dyestuff intermediate. When the coupling is complete at a pH of 7 to 8, the dye of the formula

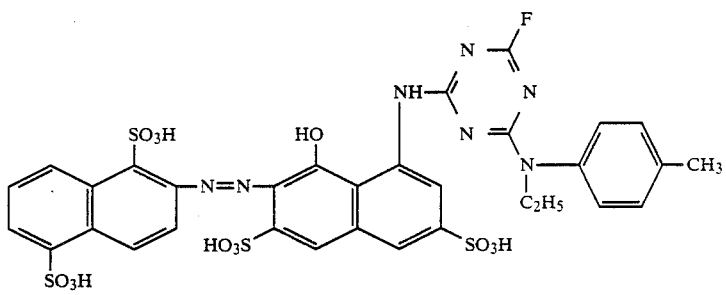

phenylurea, dissolved in 10 parts of concentrated hydrochlorid acid and 150 parts of water are added and the coupling is brought to competion by neutralising the mixture to pH 3 to 5. The resulting aminoazo dye is salted out, collected by suction, washed and then dissolved again at pH 7 in 1400 parts of water with the addition of sodium hydroxide. A solution of 26 parts of 2,4-difluoro-6-N-ethylphenylamino-1,3,5-triazine in 100 parts of dioxan is then added dropwise at 0°–10° C. and the pH is kept at 6.5 to 7 with 2N sodium hydroxide solution. When the reaction (which is followed by chromatography) is complete, the reactive dye of the formula is precipitated by adding sodium chloride, collected by suction, washed and dried in vacuo. The production is a dark red powder which dyes cotton or regenerated cellulose in clear bluish red shades of good wet- and lightfastness and good fastness to rubbing.

EXAMPLE 4

35.3 parts of the sodium salt of 1-amino-hydroxynaphthalene-3,6-disulfonic acid are reacted with 14.2 parts of 2,4,6-trifluoro-1,3,5-triazine in accordance with the particulars of Example 3. To the solution of the dyestuff intermediate are then added at 0° to 5° C. 17.3 parts of diazotised 1-aminobenzene-2-sulfonic acid, dis-

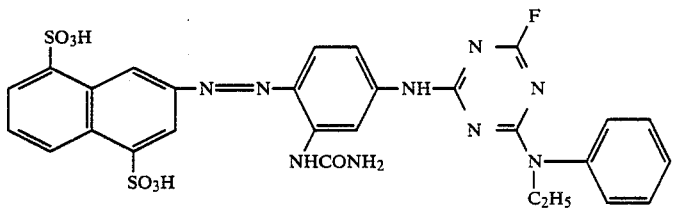

is salted out with sodium chloride, collected by filtration and dried, affording an orange powder which dyes cotton in reddish yellow shades of good wet- and lightfastness and good fastness to rubbing.

EXAMPLE 3

14.2 parts of 2,4,6-trifluoro-1,3,5-triazine are added dropwise at 0° C. in the course of 15 minutes to a solution of 36.3 parts of the sodium salt of 1-amino-8-hydroxynaphthalene-3,6-disulfonic acid in 400 parts of water while keeping a pH value of 4 to 4.5 by continually neutralising the hydrogen fluoride set free during the reaction. When the reaction is complete, 14.2 parts of 4-ethylamino-1-methylbenzene are added and further solved in 200 parts of water, and coupling is effected in a pH range of 4 to 5. When the coupling is complete, 14.2 parts of 3-ethylamino-1-methylbenzene are added to the dyestuff solution. The temperature is then raised to 20° C. and the pH is kept at 7 to 7.5 with 2N sodium carbonate solution during the ensuing condensation. When the reaction is complete, the dye of the formula

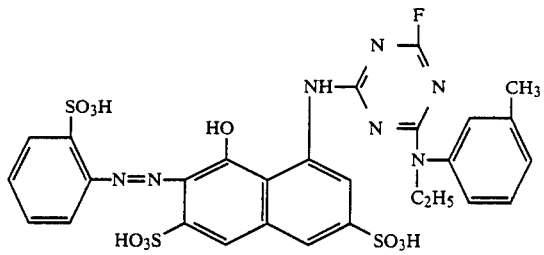

is salted out with sodium chloride, collected by suction, washed and dried in vacuo. This dye colours cellulosic fabrics in bluish red shades which are wet- and lightfast and fast to rubbing.

Dyeing Procedure 1

2 parts of the dye obtained according to Example 1 are dissolved in 100 parts of water while adding 0.5 part of sodium m-nitrobenzenesulfonate. A cotton fabric is impregnated with the resulting solution to a liquor pick-up of 75% and then dried.

The fabric is then impregnated with a warm solution of 20° C. which contains, per liter, 5 g of sodium hydroxide and 300 g of sodium chloride, and squeezed out to a pick-up of 75%. The dyeing is steamed for 30 seconds at 100° to 101° C., rinsed, soaped for a quater of an hour in a 0.3% boiling solution of a non-ionic detergent, rinsed and dried.

Dyeing Procedure 2

2 parts of the dye obtained according to Example 1 are dissolved in 100 parts of water. The solution is added to 1900 parts of cold water, 60 parts of sodium chloride are added and 100 parts of a cotton fabric are put into this dyebath. The temperature is raised to 40° C. and 40 parts of calcined sodium carbonate and another 60 parts of sodium chloride are added after 30 minutes. The temperature is kept for 30 minutes at 40° C. The dyeing is rinsed and then soaped for 15 minutes in a 0.3% boiling solution of a non-ionic detergent, rinsed and dried.

What is claimed is:

1. The dye of the formula

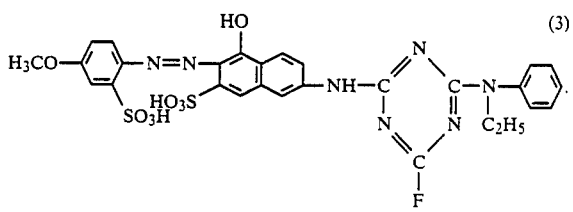

(3)

2. The dye of the formula

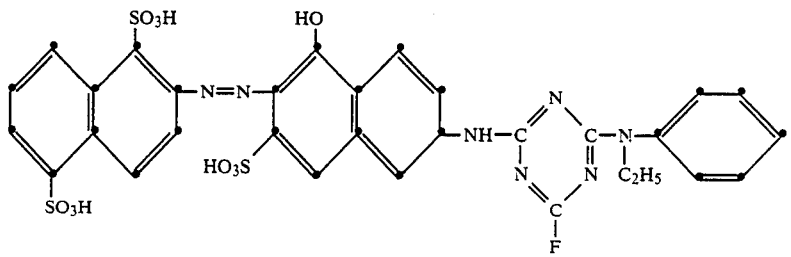

* * * * *